US011237745B2

United States Patent
Nakamura et al.

(10) Patent No.: US 11,237,745 B2
(45) Date of Patent: Feb. 1, 2022

(54) COMPUTER SYSTEM AND VOLUME ARRANGEMENT METHOD IN COMPUTER SYSTEM TO REDUCE RESOURCE IMBALANCE

(71) Applicant: Hitachi, Ltd., Tokyo (JP)

(72) Inventors: Takaki Nakamura, Tokyo (JP); Hideo Saito, Tokyo (JP); Yoshinori Ohira, Tokyo (JP); Azusa Jin, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 10 days.

(21) Appl. No.: 16/553,359

(22) Filed: Aug. 28, 2019

(65) Prior Publication Data

US 2020/0167092 A1 May 28, 2020

(30) Foreign Application Priority Data

Nov. 22, 2018 (JP) .............................. JP2018-219451

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC ............ *G06F 3/0644* (2013.01); *G06F 3/065* (2013.01); *G06F 3/0613* (2013.01); *G06F 3/0647* (2013.01); *G06F 3/0659* (2013.01); *G06F 3/0683* (2013.01)

(58) Field of Classification Search
CPC .... G06F 3/0644; G06F 3/0647; G06F 3/0613; G06F 3/0659; G06F 3/0683
See application file for complete search history.

(56) References Cited

U.S. PATENT DOCUMENTS

| 8,793,372 | B2 | 7/2014 | Ashok et al. | |
|---|---|---|---|---|
| 8,914,598 | B2 | 12/2014 | Gulati et al. | |
| 10,423,455 | B2 * | 9/2019 | Bianchini | G06F 9/5072 |
| 2010/0125715 | A1 * | 5/2010 | Takamatsu | G06F 3/0632 |
| | | | | 711/170 |
| 2013/0080727 | A1 * | 3/2013 | Naito | G06F 3/0685 |
| | | | | 711/165 |
| 2014/0282541 | A1 * | 9/2014 | Perlegos | G06F 9/5083 |
| | | | | 718/1 |
| 2018/0173426 | A1 * | 6/2018 | Condict | G06F 3/0631 |
| 2019/0004837 | A1 * | 1/2019 | Tiwary | H04L 67/10 |

* cited by examiner

Primary Examiner — Mark A Giardino, Jr.
(74) Attorney, Agent, or Firm — Baker Botts L.L.P.

(57) ABSTRACT

To more effectively eliminate a resource imbalance among storage apparatuses, and shorten the time required for elimination in a computer system including a plurality of storage apparatuses and a computer. In a computer system including a plurality of storage apparatuses that provide a volume to a computer and a storage management device that manages the plurality of storage apparatuses, in a case where there is an instruction to create a new volume, the storage management device compares a distribution of feature amounts of all volumes provided by each storage apparatus and a distribution of feature amounts of all volumes in a case of providing a newly created volume in each storage apparatus, and instructs a storage apparatus having a largest difference in the distributions of the feature amounts to create a volume.

12 Claims, 17 Drawing Sheets

FIG. 5

311  FEATURE AMOUNT MANAGEMENT TABLE

| LUN | VIEWPOINT 1: AVERAGE IOPS | VIEWPOINT 2: AVERAGE R RATIO | VIEWPOINT 3: DEFINITION SIZE | VIEWPOINT 4: EFFECTIVE SIZE | VIEWPOINT 5: AVERAGE I/O THROUGHPUT |
|---|---|---|---|---|---|
| 0 | 100 | 0.9 | 100GB | 20GB | 10MB/s |
| 1 | 15 | 0.1 | 20GB | 5GB | 1MB/s |
| 2 | 20 | 0.5 | 10GB | 1GB | 2MB/s |
| ... | ... | ... | ... | ... | ... |

(columns: 501, 502, 503, 504, 505, 506)

FIG. 6

312  VOLUME BLOCK MAPPING MANAGEMENT TABLE

| LUN | LOGICAL BLOCK # | PHYSICAL BLOCK # |
|---|---|---|
| 0 | 0 | 10 |
| 0 | 1 | N/A |
| 0 | 2 | 11 |
| ... | ... | ... |
| 1 | 0 | 30 |
| 1 | 1 | 31 |
| 1 | 2 | 32 |
| ... | ... | ... |

(columns: 601, 602, 603)

FIG. 7

411 FEATURE AMOUNT CATEGORY-SPECIFIED INDICATOR

| CATEGORY # (701) | VOL SIZE (702) | PERFORMANCE REQUIREMENT (703) | FINAL CREATION APPARATUS # (704) |
|---|---|---|---|
| 1 | LARGE | Gold | 2 |
| 2 | LARGE | Silver | 2 |
| 3 | LARGE | Bronze | 3 |
| 4 | MEDIUM | Gold | 4 |
| 5 | MEDIUM | Silver | 5 |
| 6 | MEDIUM | Bronze | 6 |
| 7 | SMALL | Gold | 7 |
| 8 | SMALL | Silver | 8 |
| 9 | SMALL | Bronze | 9 |

FIG. 8

412    STORAGE APPARATUS MANAGEMENT TABLE

| STORAGE APPARATUS # | IP ADDRESS | FREE CAPACITY | FREE CPU UTILIZATION RATE |
|---|---|---|---|
| 1 | 192.168.1.11 | 100GB | 1.1 |
| 2 | 192.168.1.12 | 200GB | 3.0 |
| 3 | 192.168.1.13 | 500GB | 4.0 |
| 4 | 192.168.1.14 | 30GB | 0.3 |
| 5 | 192.168.1.15 | 400GB | 3.0 |
| 6 | 192.168.1.16 | 200GB | 4.0 |
| 7 | 192.168.1.17 | 300GB | 2.1 |
| 8 | 192.168.1.18 | 400GB | 5.0 |
| 9 | 192.168.1.19 | 50GB | 0.5 |
| 10 | 192.168.1.20 | 100GB | 1.5 |

FIG. 9

413 NUMBER OF FEATURE AMOUNT CATEGORY-SPECIFIED VOLUME MANAGEMENT TABLE

| CATEGORY # | STORAGE APPARATUS # | VOL SIZE | PERFORMANCE REQUIREMENT | NUMBER OF VOLUME |
|---|---|---|---|---|
| 1 | 1 | LARGE | Gold | 1 |
| 1 | 2 | LARGE | Gold | 2 |
| 1 | 3 | LARGE | Gold | 10 |
| 1 | 4 | LARGE | Gold | 3 |
| 1 | 5 | LARGE | Gold | 6 |
| 1 | 6 | LARGE | Gold | 6 |
| 1 | 7 | LARGE | Gold | 4 |
| 1 | 8 | LARGE | Gold | 5 |
| 1 | 9 | LARGE | Gold | 9 |
| 1 | 10 | LARGE | Gold | 4 |
| 2 | 1 | LARGE | Silver | 3 |
| 2 | 2 | LARGE | Silver | 1 |
| ... | ... | ... | ... | ... |

901  902  903  904  905

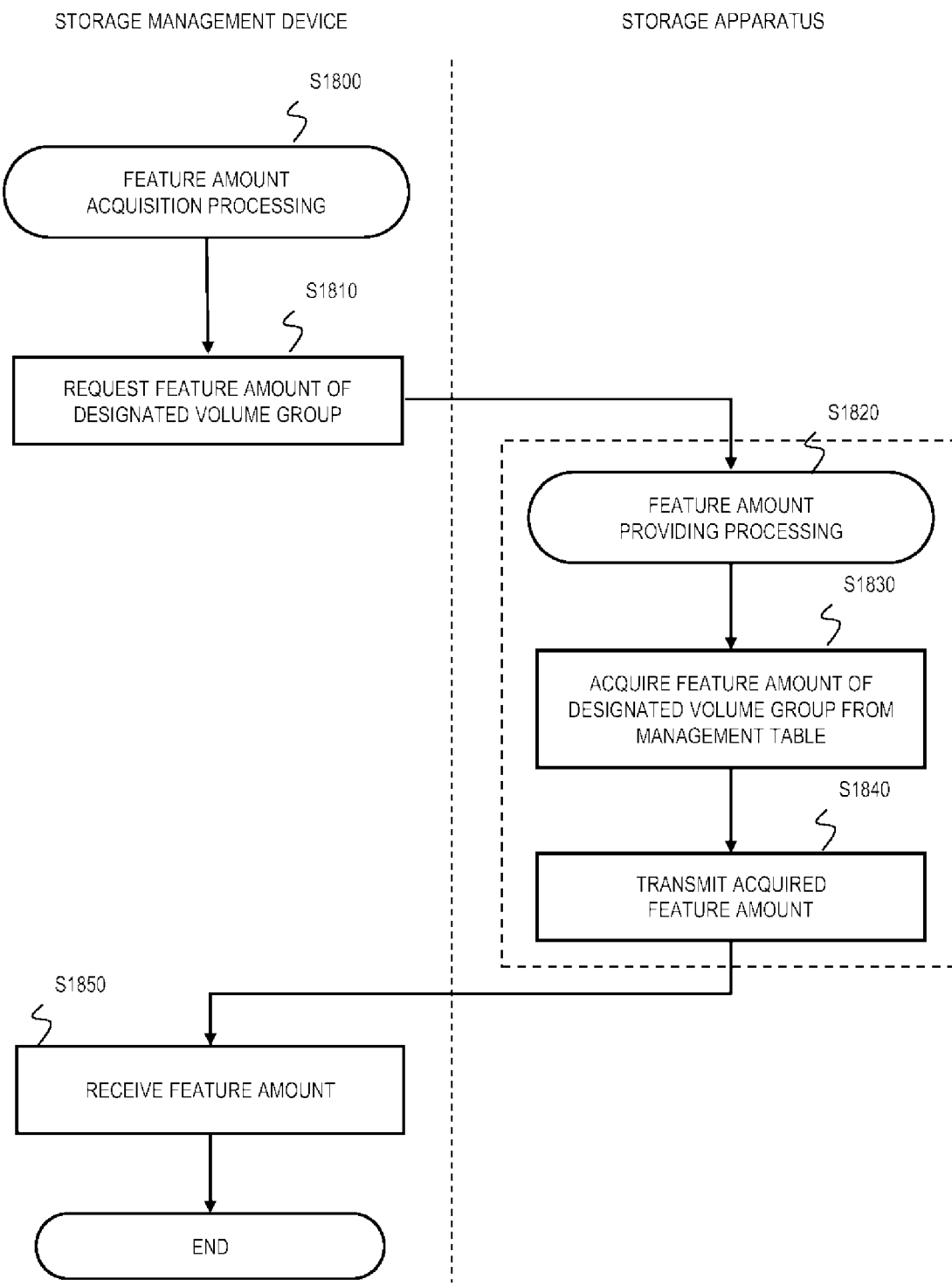

COMPUTER SYSTEM AND VOLUME ARRANGEMENT METHOD IN COMPUTER SYSTEM TO REDUCE RESOURCE IMBALANCE

CLAIM OF PRIORITY

The present application claims priority to Japanese Patent Application No. 2018-219451 filed on Nov. 22, 2018, the content of which is hereby incorporated by reference into this application.

BACKGROUND OF THE INVENTION

1. Field of the Invention

The present invention relates to a computer system and a volume arrangement method in the computer system.

2. Description of the Related Art

There is a distributed storage system in which a storage system is configured with a plurality of storage apparatuses, and is expanded by adding a storage apparatus when performance and capacity are insufficient. In the distributed storage system, a deviation in resources such as storage service load and capacity may occur among the storage apparatuses. When the deviation in resources occurs, the storage service performance of the volume provided by a specific storage apparatus may decrease.

In order not to generate the imbalance, it is common to perform an optimization by initial placement and replacement. For example, when a volume creation request is made, a volume is created in a storage apparatus having a low load or a large amount of free capacity. In addition, during volume service, a threshold value in a deviation in storage service load or capacity is provided, and when the threshold value is exceeded, the storage service or volume data is moved to a storage apparatus having a low load or a low usage capacity.

At this time, when the capacity of a target volume to be moved or the size of the load (storage service load) with respect to the target volume is too large or too small, the imbalance may not be sufficiently improved. In addition, it may take time to eliminate the imbalance.

U.S. Pat. No. 8,793,372 specification (Patent Literature 1) and U.S. Pat. No. 8,914,598 specification (Patent Literature 2) disclose techniques for eliminating such imbalance.

In Patent Literature 1, when a volume creation request is made, the I/O latency is set as small as possible, and a volume is created in a storage apparatus less than threshold values of the network latency and a network bandwidth utilization rate, thereby balancing the deviation in storage service load.

Patent Literature 2 discloses a technique for balancing an inter-volume load by migrating a disk image in a high load volume to a low load volume when the imbalance occurs. According to Patent Literature 2, an embodiment is disclosed, in which the time required for eliminating the imbalance is shortened by moving the disk image having the smallest data amount in the high load volume when data movement is performed from the high load volume to the low load volume.

According to the technique described in Patent Literature 1, when a volume creation request is made, a volume size is not taken into consideration when determining a storage apparatus for providing a volume and receiving the creation request. Therefore, even if the volume is to be migrated in order to eliminate the imbalance, problems occur that the volume size is too large to be migrated, or the migration takes time.

According to the technique described in Patent Literature 2, it is disclosed that the imbalance in consideration of a data size (disk image size) is eliminated, but in a case where there is only a disk image having a large data amount in the high load volume, the elimination of the imbalance takes time.

SUMMARY OF THE INVENTION

Therefore, an object of the invention is to provide a computer system and a volume arrangement method in the computer system that can easily eliminate the imbalance in load or usage capacity of a plurality of storage apparatuses.

In order to achieve the above object, an aspect of a computer system of the invention includes a plurality of storage apparatuses that provide a volume to a computer, and a storage management device that manages the plurality of storage apparatuses, in which when a new volume is to be created in any storage apparatus of the plurality of storage apparatuses, the storage management device selects a storage apparatus in which a distribution of feature amounts of a plurality of volumes provided to the computer by each storage apparatus increases, and the selected storage apparatus creates the new volume.

According to the invention, in a system in which a plurality of storage apparatuses provide a plurality of volumes to one or more computers, when it is necessary to rearrange the volumes, a degree of imbalance can be further reduced by selecting a volume having a feature amount that reduces the imbalance. In addition, since the volume of an appropriate size and appropriate load is selected and migrated, the migration time can be shortened, and the time required for eliminating the imbalance can be shortened.

BRIEF DESCRIPTION OF THE DRAWINGS

FIG. 5 is a configuration diagram of a feature amount management table.

FIG. 6 is a configuration diagram of a volume management table.

FIG. 7 is a configuration diagram of a feature amount category-specified indicator.

FIG. 8 is a configuration diagram of a storage apparatus management table.

FIG. 9 is a configuration diagram of the number of feature amount category-specified volume number management table.

FIG. 18 is a flowchart of a feature amount acquisition processing and a feature amount providing processing.

DESCRIPTION OF EMBODIMENTS

Embodiments will be described with reference to the drawings. The embodiments described below do not limit the invention according to the claims, and all of the elements and combinations thereof described in the embodiments are not necessarily essential to the solution to the problem.

In the following description, information may be described in an expression "AAA table", however, the information may be expressed by any data structure. That is, the "AAA table" may be referred to as "AAA information" to indicate that the information does not depend on data structure.

In addition, in the following description, a "processor unit" includes one or more processors. At least one processor is typically a central processing unit (CPU). The processor may include a hardware circuit that performs some or all of the processing.

Further, in the following description, a processing may be described with a "program" as a subject of an operation, however, the program may be executed by a processor (e.g., CPU) to perform a predetermined processing while using storage resources (e.g., memory) appropriately, and therefore, the subject of actual processing may also be the processor. Accordingly, the processing described with the program as the subject of the operation may also be a processing performed by a device including the processor. In addition, a hardware circuit that performs some or all of the processing performed by the processor may also be included. A computer program may also be installed in a device from a program source. The program source may be, for example, a program distribution server or a computer readable storage medium.

Outline

The present technology relates to a distributed storage system in which a plurality of storage apparatuses provide a plurality of volumes to one or more computers, and relates to an optimization of allocation of storage apparatuses that provide volumes. That is, the present technology is directed to a computer system that performs volume arrangement (placement) that reduces balance insufficient in future rebalance and shortens migration time.

System Configuration

First, a computer system according to one embodiment of the invention will be described.

Figure 1:
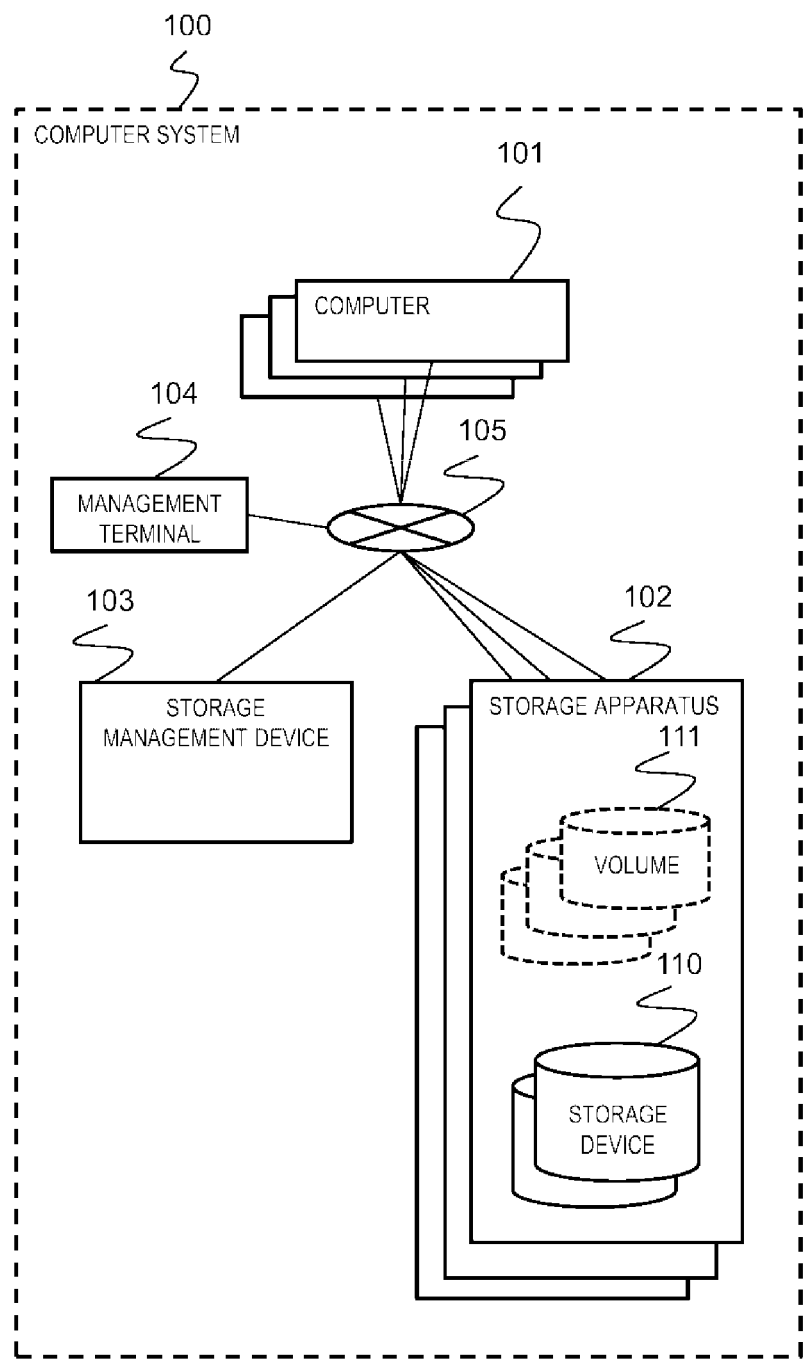
FIG. 1 is an overall configuration diagram of a computer system.

FIG. 1 is an overall configuration diagram of the computer system according to one embodiment.

A computer system 100 includes one or more computers 101, one or more storage apparatuses 102, a storage management device 103, a management terminal 104, and a network 105 that connects the above.

One or more storage devices 110 are built in or externally connected to the storage apparatus 102. The storage apparatus 102 provides one or more volumes 111 to the computer 101.

The volume 111 is configured with a plurality of logical blocks. The logical block size in the present embodiment is, for example, a size same as a management unit of Thin Provisioning (capacity virtualization) that allocates a physical block to a logical block during writing. The logical block may not have a size same as the management unit of the Thin Provisioning. A plurality of physical blocks are formed based on a storage region of the storage device 110. A physical block is allocated to the logical block of the volume 111.

In the computer system shown in FIG. 1, the computer 101, the storage apparatus 102, and the storage management device 103 are separately configured, however, the computer 101, the storage apparatus 102, and the storage management device 103 may also be configured using a single bare metal (physical computer). For example, the computer system may be a virtual computer called a Virtual Machine (VM) in which the computer 101, the storage apparatus 102, and the storage management device 103 operate on the same computer, or may be a container configured by container virtualization. In addition, the storage management device 103 is not necessarily an independent device, and functions thereof may be included in any of the storage apparatuses 102.

Next, a hardware configuration of the storage apparatus 102 will be described.

Figure 2:
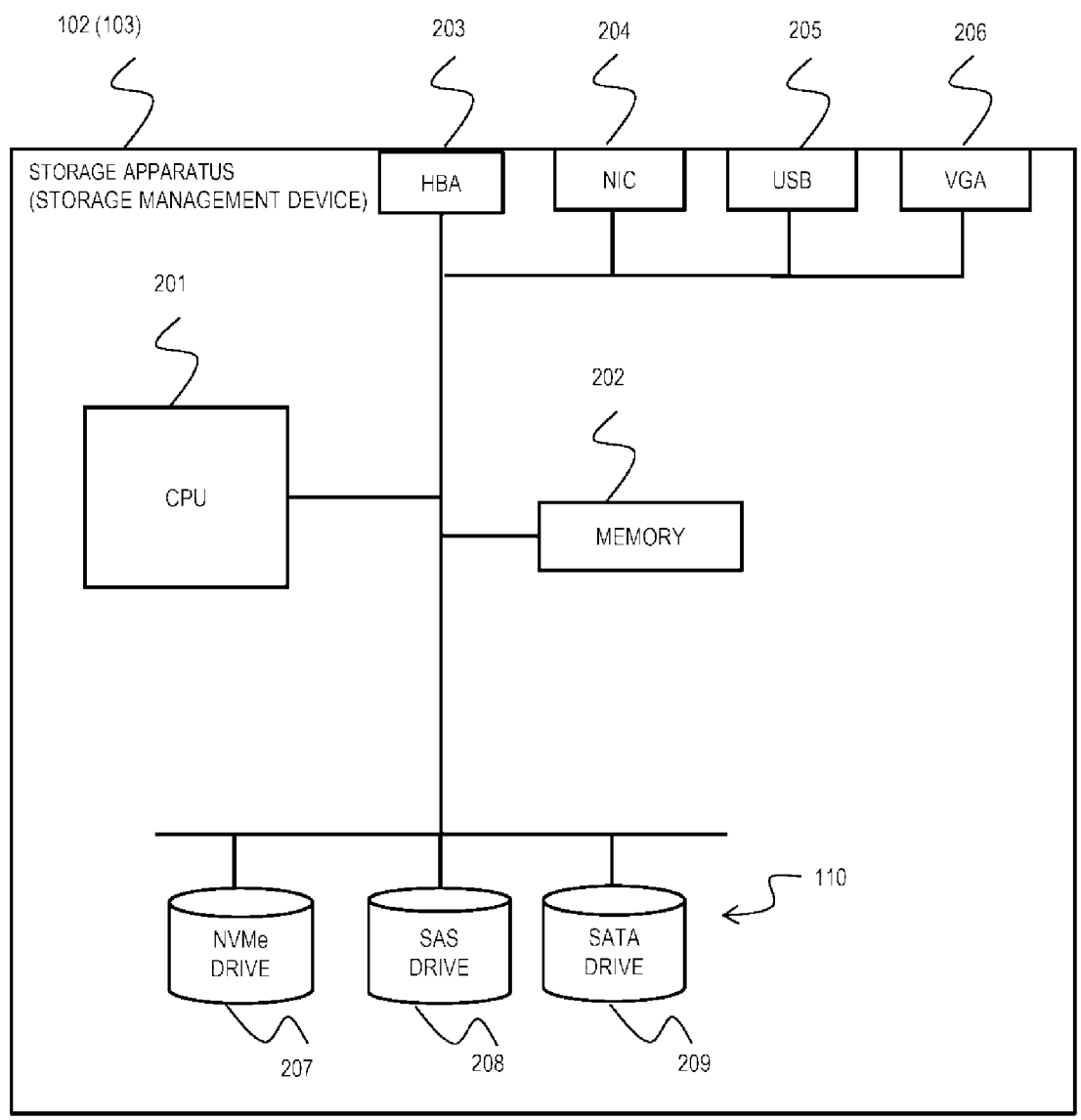
FIG. 2 is a hardware configuration diagram of a storage apparatus or a storage management device.

FIG. 2 is a hardware configuration diagram of the storage apparatus according to one embodiment.

In the present embodiment, the basic configurations of the hardware of the storage apparatus 102 and the storage management device 103 are basically the same.

The storage apparatus 102 (103) is configured with, for example, a computer such as a PC or a server, and includes a Central Processing Unit (CPU) 201 as an example of a processor unit, a memory 202, a Host Bus Adapter (HBA) 203, a Network Interface Card (NIC) 204, a Universal Serial Bus (USB) 205, a Video Graphics Array (VGA) 206, and a storage device 110. These components are connected to each other via an internal bus or an external bus.

Examples of the storage device 110 include external drives (not shown) such as a non-volatile memory express (NVMe) drive 207, a serial attached SCSI (SAS) drive 208, a serial ATA (SATA) drive 209, which are connected to the HBA 203.

Next, the configuration of the memory of the storage apparatus 102 will be described.

Figure 3:
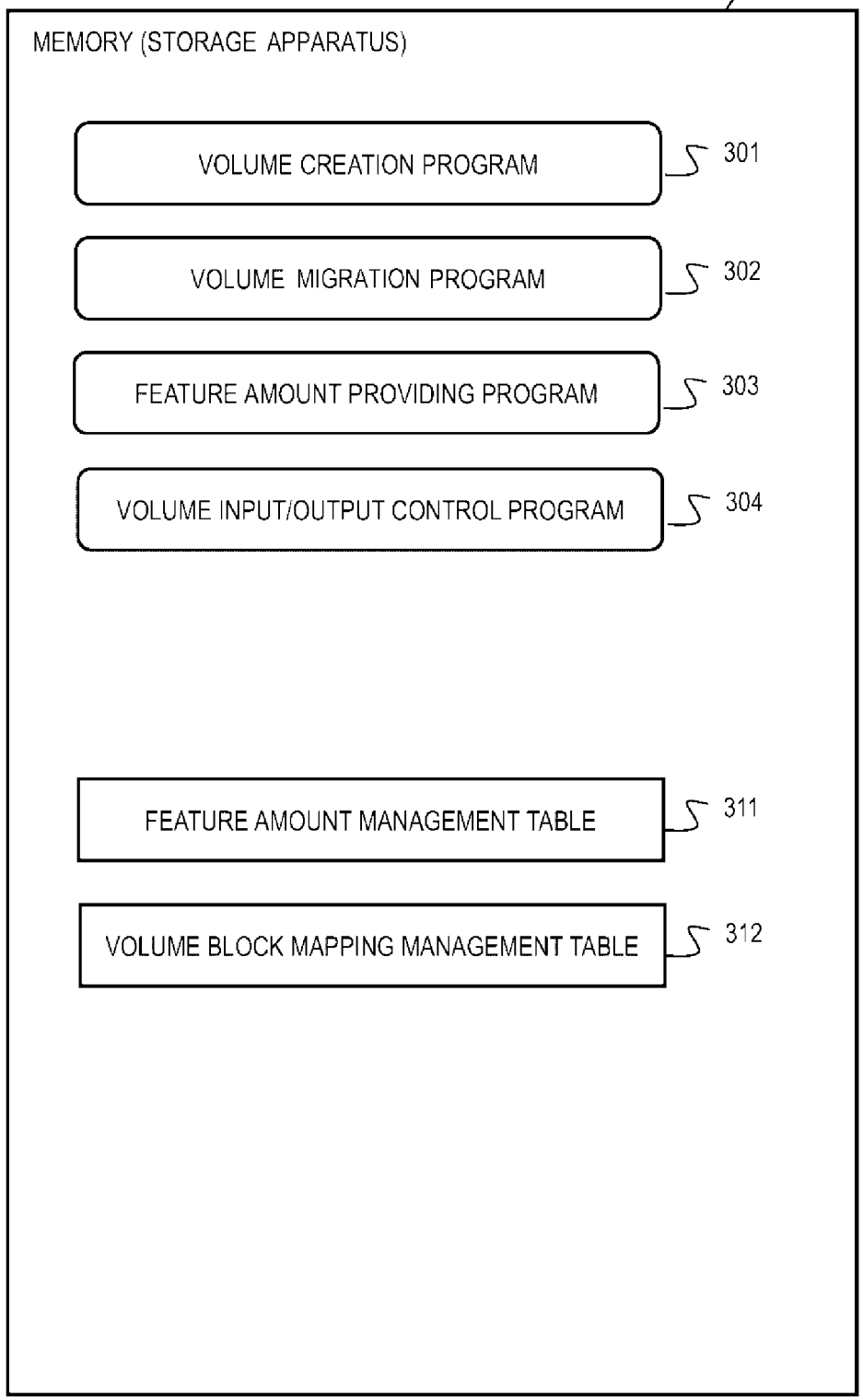
FIG. 3 is a configuration diagram of a memory of the storage apparatus.

FIG. 3 is a configuration diagram of the memory of the storage apparatus according to one embodiment.

The memory 202 (202A) of the storage apparatus 102 stores a volume creation program 301, a volume migration program 302, a feature amount providing program 303, and a volume input/output control program 304. In addition, the memory 202A also stores a feature amount management table 311 and a volume block mapping management table 312. In addition, the memory 202A stores programs and tables for implementing other storage services (not shown).

Next, the configuration of the memory of the storage apparatus 112 as a copy destination will be described.

Figure 4:
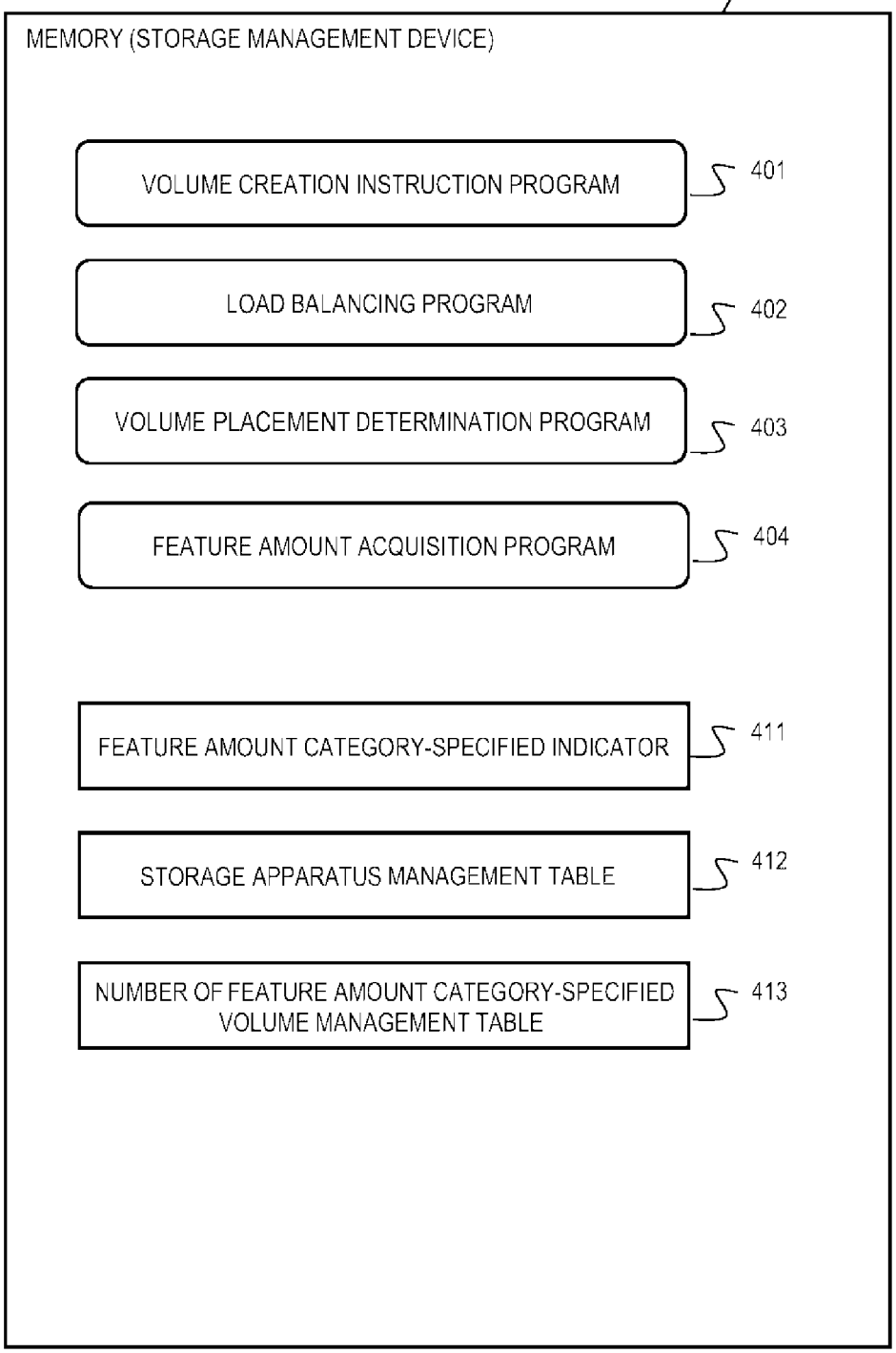
FIG. 4 is a configuration diagram of a memory of the storage management device.

FIG. 4 is a configuration diagram of the memory of the storage management device according to one embodiment.

The memory 202 (202B) of the storage management device 103 stores a volume creation instruction program 401, a load balancing program 402, a volume placement determination program 403, and a feature amount acquisition program 404. In addition, the memory 202B stores a feature amount category-specified indicator 411, a storage apparatus management table 412, and a feature amount category-specified volume number management table 413.

In addition, the memory 202B stores programs and tables for implementing other storage management services (not shown).

Next, a configuration of the feature amount management table 311 will be described.

Various Kinds of Information (Table)

FIG. 5 is a configuration diagram of the feature amount management table according to one embodiment.

The feature amount management table 311 stores rows corresponding to respective volumes (also referred to as a Logical Unit: LU). Each row includes items of a Logical Unit Number (LUN) 501, an average IOPS 502, an average R ratio 503, a definition size 504, an effective size 505, and an average I/O throughput 506 as columns. Each of the columns from 502 to 506 is a viewpoint of each feature amount. That is, the feature amount is an attribute of a volume characterized by volume size (effective, logical), volume I/O load (throughput, IOPS, latency), read/write ratio of I/O, and the type of a middleware or an application using the volume.

The LUN 501 stores an LUN capable of specifying a volume. The average IOPS 502 stores the number of I/O request processing per average unit time with respect to the volume. The average R ratio 503 stores a ratio of a read request among the total number of I/O requests with respect to the volume. The definition size 504 stores a definition size of the volume. That is, the total size of all the logical blocks of the volume. The effective size 505 stores a size that is actually used in the volume. That is, a total size of all the physical blocks allocated to the volume. The average I/O throughput 506 stores a data input/output amount per average unit time with respect to the volume.

The average IOPS of a viewpoint 1 and the average I/O throughput of a viewpoint 5 indicate performance requirements of the volume, and the effective size of a viewpoint 4 indicates the usage capacity of the volume and is an essential viewpoint in order to disperse the feature amount of the volume. The average R ratio of a viewpoint 2 and the definition size of a viewpoint 3 are viewpoints that one or both of them should be considered in accordance with a requirement of the user of the storage apparatus with respect to the volume.

The feature amount management table 311 may be configured to be stored for each storage apparatus 102, give an ID for identifying each storage apparatus when the feature amount is read by the feature amount acquisition program 404 of the storage management device 103, and provide the ID to the storage management device 103.

The feature amount illustrated in FIG. 5 is a scalar value for each viewpoint, but may also be a vector value for each viewpoint. In addition, a value representing a type of the middleware using the volume may exist as a viewpoint. In addition, in a case where the middleware using the volume is configured in a cluster type, there may also be a value representing the type of a node of the middleware using the volume as a viewpoint. The type of the node of the middleware is a difference in a region in charge of a primary, a secondary, or a shearing of a replica set. Further, a value representing the type of a computer using the volume may also exist as a viewpoint.

Next, the configuration of the volume block mapping management table 312 will be described.

FIG. 6 is a configuration diagram of the volume block mapping management table according to one embodiment.

The volume block mapping management table 312 stores rows corresponding to respective volumes. Each row includes items of an LUN 601, a logical block #602, and a physical block #603 as columns.

The LUN 601 stores an LUN for specifying a volume. The logical block #602 stores a logical block number of the volume. The physical block #603 stores a physical block number corresponding to the logical block number of the volume. The physical block number is, for example, a pair of the ID of the storage device and the physical block number, and a block number in a pool including a plurality of storage devices.

Next, the configuration of the feature amount category-specified indicator 411 will be described.

FIG. 7 is a configuration diagram of the feature amount category-specified indicator according to one embodiment.

The feature amount category-specified indicator 411 stores the row corresponding to the feature amount category of the volume. Each row includes items of a category #701, a VOL size 702, a performance requirement 703, and a final creation apparatus 704 as columns. That is, the feature amount category-specified indicator 411 has information on the management number of the storage apparatus in which the volume is finally created for each category of the feature amount of the volume.

The category #701 stores the number of the feature amount category corresponding to the row. The VOL size 702 stores category information of the size of the volume corresponding to the row. For example, in a case where a volume of less than 100 GB is small, a volume of equal to or more than 100 GB and less than 2 TB is medium, and a volume of equal to or more than 2 TB is large, information indicating small, medium, and large is stored respectively.

The performance requirement 703 stores category information of performance requirements such as an average IPOS and an average I/O throughput of the volume corresponding to the row. For example, in a case where a volume of a performance requirement having an average IPOS of less than 100 IOPS is set to Bronze, a volume of a performance requirement having an average IPOS of equal to or more than 100 IOPS and less than 1000 IOPS is set to Silver, and a volume of a performance requirement having an average IPOS of equal to or more than 1000 IOPS is set to Gold, information indicating Bronze, Silver, and Gold is stored respectively. The final creation apparatus 704 stores the management number of the storage apparatus in which the volume of the category corresponding to the row is finally created.

Next, the configuration of the storage apparatus management table 412 will be described.

FIG. 8 is a configuration diagram of the storage apparatus management table.

The storage apparatus management table 412 stores rows corresponding to the storage apparatus. Each row includes items of a storage apparatus #801, an IP address 802, a free capacity 803, and a free CPU utilization rate 804 as columns.

The storage apparatus #801 stores an ID for specifying a storage apparatus. The IP address 802 stores the IP address that is allocated to the storage apparatus. The free capacity 803 stores a current free capacity of the storage apparatus. The free CPU utilization rate 804 stores the free CPU utilization rate of the storage apparatus.

FIG. 9 is a configuration diagram of the number of feature amount category-specified volume management table according to one embodiment.

The number of feature amount category-specified volume management table 413 stores the row corresponding to the category and the storage apparatus. Each row includes a category #901, a storage apparatus #902, a VOL size 903, a performance requirement 904, and a volume number 905 as columns.

The category #901 stores the number of the feature amount category corresponding to the row. The storage apparatus #902 stores the management number of the storage apparatus corresponding to the row. The VOL size 903 stores the category information of the size of the volume corresponding to the row. For example, when a volume of less than 100 GB is small, a volume of equal to or more than 100 GB and less than 2 TB is medium, and a volume of equal to or more than 2 TB is large, information indicating small, medium, and large is stored respectively. The performance requirement 904 stores category information of performance requirements such as an average IPOS and an average I/O throughput of the volume corresponding to the row. For example, when a volume of a performance requirement having an average IPOS of less than 100 IOPS is set to Bronze, a volume of a performance requirement having an average IPOS of equal to or more than 100 IOPS and less than 1000 IOPS is set to Silver, and a volume of a performance requirement having an average IPOS of equal to or more than 1000 IOPS is set to Gold, information indicating Bronze, Silver, and Gold is stored respectively. The volume number 905 stores the number of volume having a feature amount category in the storage apparatus corresponding to the row.

Various Processing Operations

Next, a processing operation of the computer system according to the present embodiment will be described.

Volume Creation Instruction Processing

First, the volume creation instruction processing will be described.

Figure 10:
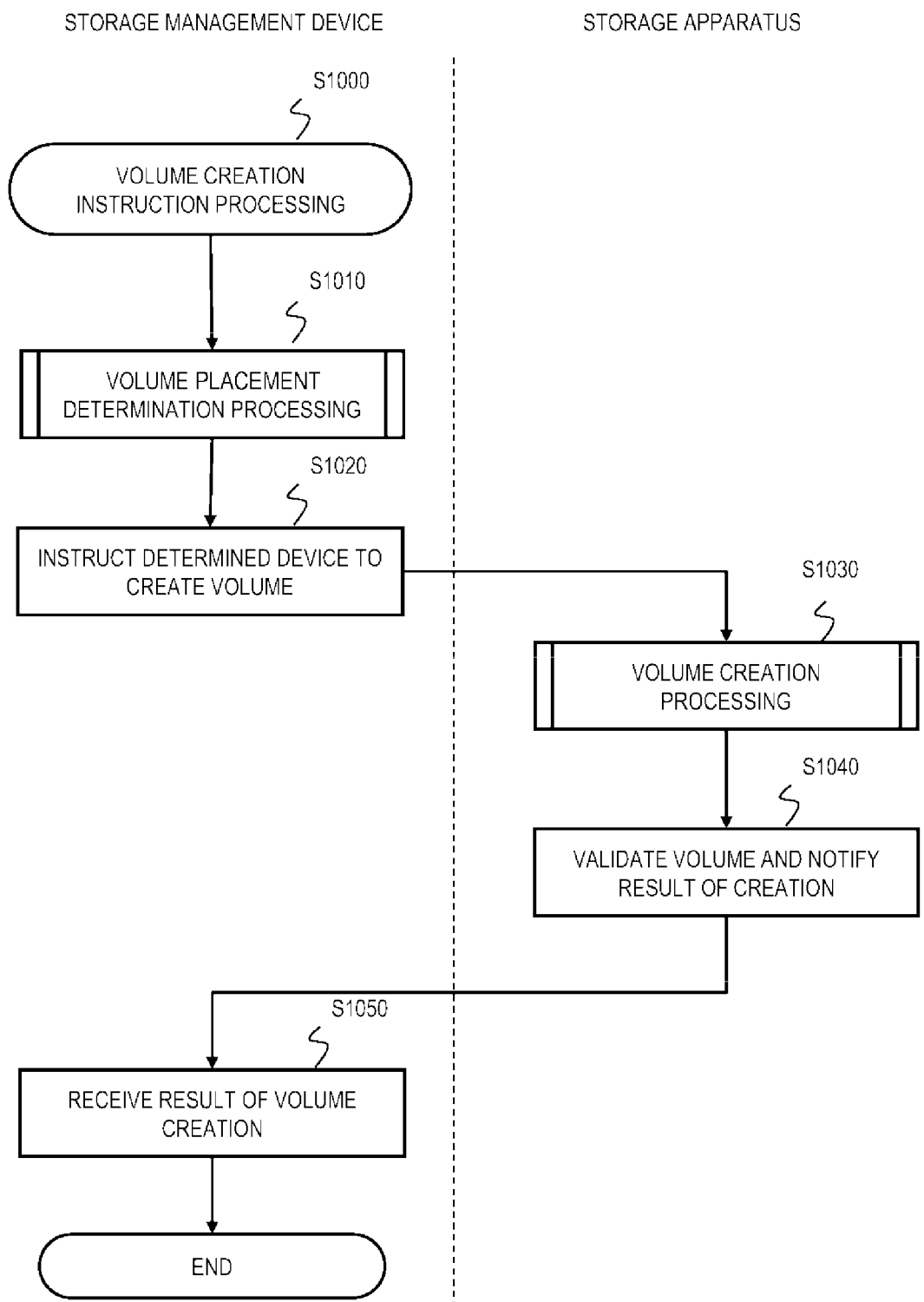
FIG. 10 is a flowchart of a volume creation instruction processing.

FIG. 10 is a flowchart of the volume creation instruction processing according to one embodiment.

The volume creation instruction processing is executed by the volume creation instruction program 401 of the storage management device 103. The volume creation instruction program 401 starts the processing in response to an instruction from an administrator via the management terminal 104 or the like.

When a new volume creation instruction processing is started (S1000), the volume creation instruction program 401 executes a volume placement determination processing so as to distribute feature amounts (capacity or performance requirement) of the volume of each storage apparatus (S1010). The volume placement determination processing has a plurality of embodiments, and will be described later with reference to FIG. 11, FIG. 12, FIG. 13, and FIG. 14, respectively. With this processing, a device for creating a volume is determined. In the present embodiment, since the feature amounts of the volumes of the respective storage apparatuses are arranged in a distributed manner, in a case where there is a need to perform volume replacement, a volume having a feature amount that reduces the imbalance is easily selected, and a degree of imbalance can be further reduced. In addition, since the volume of an appropriate size and appropriate load is selected and migrated, the migration time can be shortened, and the time required for eliminating the imbalance can be shortened.

Next, the volume creation instruction program 401 requests the determined storage apparatus 102 to create a volume (S1020).

Next, upon receiving the volume creation request, the storage apparatus 102 executes a volume creation processing (S1030). The volume creation processing will be described later with reference to FIG. 16.

Next, upon receiving the volume creation request, the storage apparatus 102 validates the created volume and notifies a result of the volume creation to the storage management device 103 (S1040). Here, the validation refers to become a state where a data input/output request from a computer to the same volume can be processed.

Next, the volume creation instruction program 401 receives the result of the volume creation (S1050), and ends the volume creation instruction processing.

Volume Placement Determination Processing (Distributed Calculation Method)

Next, the volume placement determination processing (distributed calculation method) (S1100) will be described.

Figure 11:
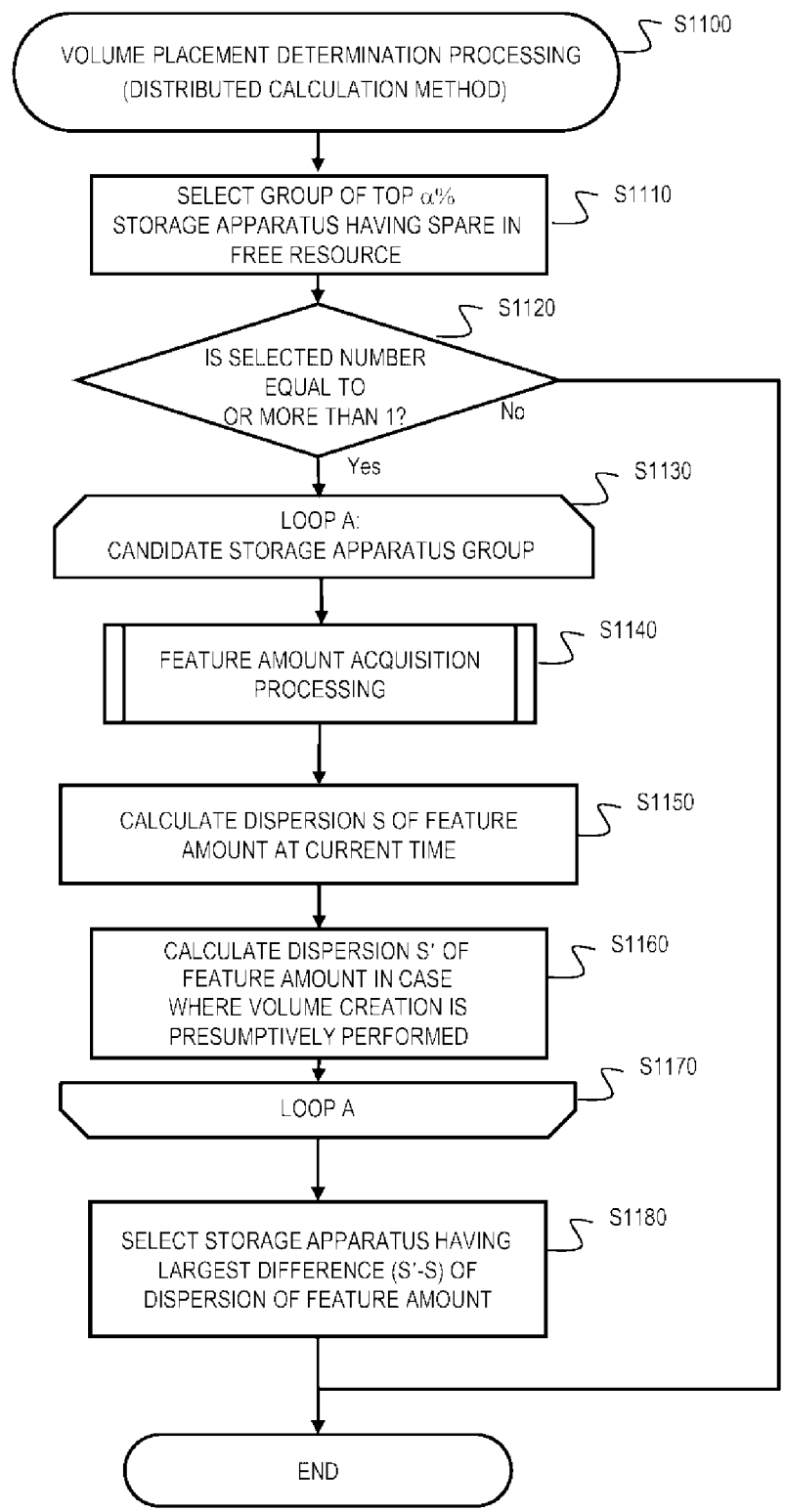
FIG. 11 is a flowchart of a volume arrangement (placement) determination processing (distributed calculation method).

FIG. 11 is a flowchart of the volume placement determination processing (distributed calculation method) according to one embodiment. The storage management device calculates a distribution of feature amounts of a volume provided by a storage apparatus at a current time and a distribution of the feature amount of a volume provided by the storage apparatus in a case where the new volume is created with respect to a group of storage apparatuses having a spare in free resource among the plurality of storage apparatuses, and instructs a storage apparatus having the largest difference between the distributions of the feature amounts to create a volume.

The volume placement determination processing (distributed calculation method) is executed by the volume placement determination program 403 of the storage management device 103.

In the volume placement determination processing (distributed calculation method), first, a group of top α% storage apparatuses having a spare in free resource is selected (S1110). The free resource is, for example, information of the storage apparatus management table 412 such as the free capacity and the free CPU utilization rate of the storage apparatus. For example, in a case where α is 20%, if the total number of storage apparatuses is 10, top two storage apparatuses having a spare in free resource are selected. α may be a value set in advance in the storage management device 103, or may be a value set by the administrator.

Next, the number of apparatus in the selected storage apparatus group is checked (S1120). When the number is equal to or more than 1, the processing proceeds to S1130. When the number is less than 1, that is, "0", it is determined that there is no apparatus capable of creating a volume since there is no storage apparatus having a spare in free resource, and the processing is ended.

Next, a loop processing is started for each apparatus in a candidate storage apparatus group (S1130).

Next, a feature amount acquisition processing is performed on the storage apparatus 102 that is being processed in the current loop processing (S1140).

Next, a distribution S of the acquired feature amount is calculated (S1150). As shown in FIG. 5, since a plurality of viewpoints exist as the feature amount, the distribution S of the feature amounts is calculated for each viewpoint. Alternatively, a distribution S of the feature amounts of only a viewpoint of interest may also be calculated.

For example, an example of a method of calculating the distribution in a case where a storage apparatus has three volumes of LUN 0, LUN 1, and LUN 2 as shown in FIG. 5 will be described. In a case where the definition size is set as the feature amount, first, an average x of feature amounts of a volume can be calculated as follows.

$$x = (\text{sum}\_\{i = 1\}^\wedge\{n\}x\_i)/n$$
$$= (100 + 20 + 10)/3 = 43.3$$

Here, x_i is a feature amount of an i-th volume, and n is the volume number of the storage apparatus.

Next, a distribution S' of the feature amount in a case where volume creation is presumptively performed is calculated (S1160). Next, the distribution S of the feature amounts of the volume can be calculated as follows.

$$S = 1/n * \text{sum}\_\{i = 1\}^\wedge\{n\}(x\_i - x)^\wedge 2$$
$$= 1/3 * ((100 - 43.3)^\wedge 2 + (20 - 43.3)^\wedge 2 + (10 - 43.3)^\wedge 2))$$
$$= 1622.2$$

Here, in a case where a volume having a definition size of 200 GB is to be created, the average x' is as follows.

$$x' = (\text{sum}\_\{i = 1\}^\wedge\{n + 1\}x\_i)/(n + 1)$$
$$= (100 + 20 + 10 + 200)/4 = 82.5$$

The distribution S' is as follows.

$$S' = 1/(n + 1) * \text{sum}\_\{i = 1\}^\wedge\{n + 1\}(x\_i - x')^\wedge 2$$
$$= 1/4 * ((100 - 82.5)^\wedge 2 + (20 - 82.5)^\wedge 2 +$$
$$(10 - 82.5)^\wedge 2) + (200 - 82.5)^\wedge 2)$$
$$= 5818.8$$

In this way, the distribution S' of the feature amount is calculated.

Similarly, the calculation may be performed for each of a plurality of viewpoints, or may also be calculated only for the viewpoint of interest.

If there is a storage apparatus that is not an object of the loop processing among the candidate storage apparatus group, the processing returns to S1130, and the same processing is performed on the next storage apparatus (S1170).

After the processing is completed with respect to all the storage apparatuses of the candidate storage apparatus group, a difference (S'−S) of the distribution of the feature amounts is calculated, and a storage apparatus having a largest difference is selected (S1180). Accordingly, the feature amounts are distributed and a storage apparatus as an arrangement destination of the new volume can be determined.

When the distributions are calculated for a plurality of viewpoints, a storage apparatus having the largest value is selected based on an arithmetic mean of the respective differences is obtained or a weighted average is obtained only using positive values. When the distribution is calculated for a single view point, only a storage apparatus having the largest difference is selected.

As described above, according to the volume placement determination processing (distributed calculation method), it is possible to distribute the feature amounts of the volume and to determine a storage apparatus as the arrangement destination of the new volume with a simple implementation.

Volume Placement Determination Processing (Categorization Indicator Method)

Next, the volume placement determination processing (categorization indicator method) (S1200) will be described.

Figure 12:
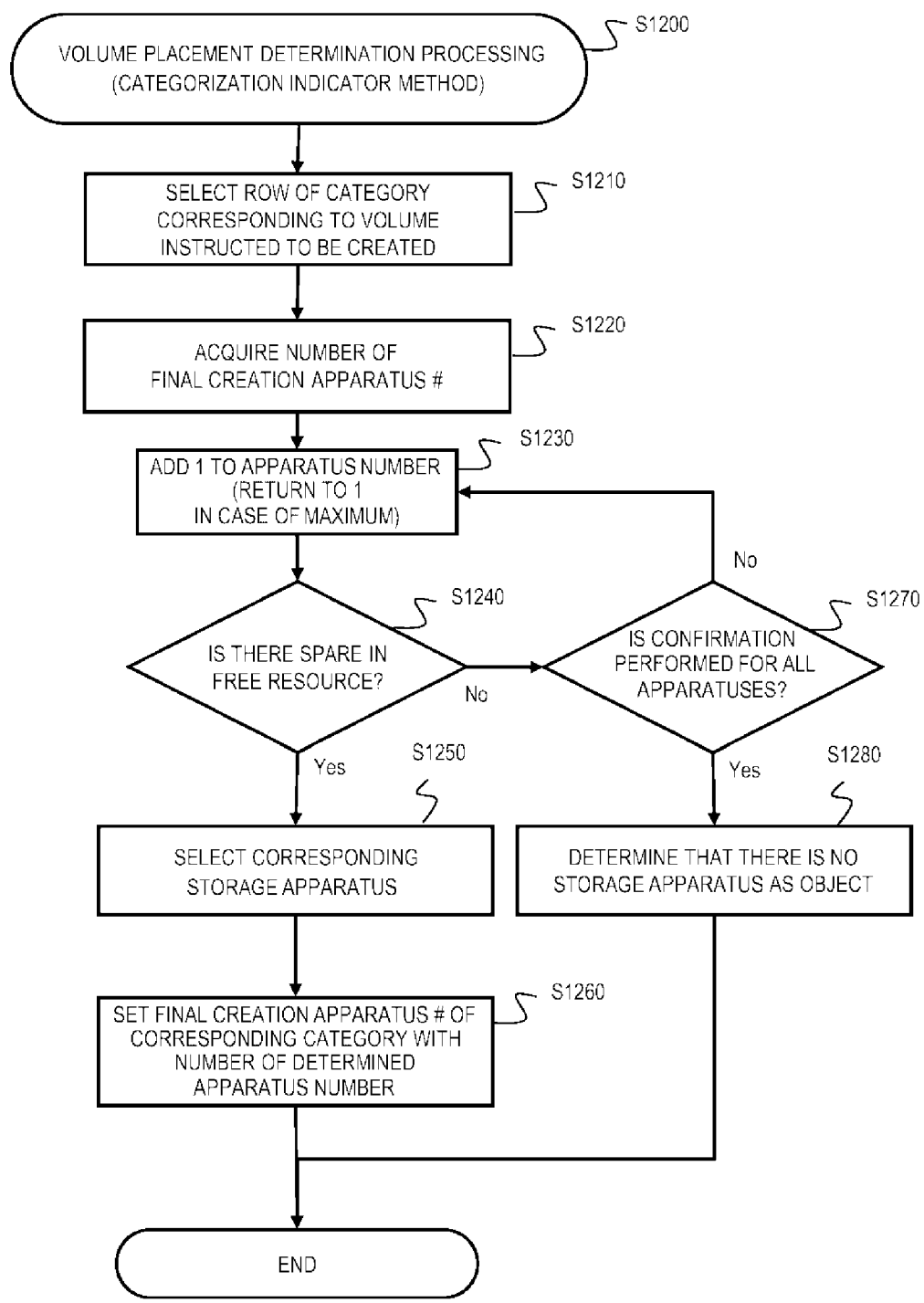
FIG. 12 is a flowchart of a volume placement determination processing (categorization indicator method).

FIG. 12 is a flowchart of the volume placement determination processing (categorization indicator method) according to one embodiment.

The volume placement determination processing (categorization indicator method) is executed by the volume placement determination program 403 of the storage management device 103.

In the volume placement determination processing (categorization indicator method), first, the feature amount category-specified indicator 411 is referred to, and a row of the category corresponding to the volume instructed to be created is selected (S1210). For example, when the size of the volume having a creation instruction is "large" and the performance requirement such as the average IPOS and the average I/O throughput is "Silver", the row of category #2 is selected.

Next, in the volume placement determination processing (categorization indicator method), the apparatus number of the final creation apparatus #704 in the corresponding row is acquired (S1220). For example, when the category #"2" is selected, the apparatus number # is "2".

Next, in the volume placement determination processing (categorization indicator method), the apparatus number is added by 1 (S1230). For example, when the acquired apparatus number is "2", "3" is obtained. That is, a storage apparatus different from the final creation apparatus in which the volume is arranged before the start of this processing is set as the arrangement destination of the volume (for example, a storage apparatus in a round robin format is selected). In the determination of the arrangement destination of the volume, a storage apparatus different from the final creation apparatus may also be set as an arrangement destination, in addition to the round robin, that is, the arrangement destination may be balanced. Therefore, for example, an initial value of the final creation apparatus is set to be different for each of the VOL size, or the performance requirement as Gold, Silver, and Bronze. Accordingly, it is possible to prevent the arrangement destinations of volumes of different performance requirements from concentrating on the same storage apparatus.

Next, in the volume placement determination processing (categorization indicator method), it is confirmed whether there is a spare in free resource for a storage apparatus corresponding to the current apparatus number (S1240). The free resource is, for example, a free capacity or a free CPU utilization rate of the storage apparatus, and is confirmed by using the information of the storage apparatus management table 412.

In a case where it is determined that there is a spare in free resource, the storage apparatus corresponding to the current apparatus number obtained in step S1230 is selected, and it is determined to create a volume (S1250).

Next, in the volume placement determination processing (categorization indicator method), the final creation apparatus # of the corresponding category is updated with the number of the determined apparatus number (S1260). For example, when the number of an apparatus in which the volume is to be created is determined to be "3", the final creation apparatus number 704 of the feature amount category-specified indicator 411 is replaced with "3".

Finally, in the volume placement determination processing (categorization indicator method), the processing is ended in response to a calling source of the number of the apparatus in which the volume is to be created.

In a case where it is determined in S1240 that there is no spare in free resource, it is confirmed whether confirmation of the free resource is performed for all the apparatuses (S1270). In a case where there remains an apparatus for which the free resource is not confirmed, the processing proceeds to S1230. In a case where the free resource is confirmed for all the apparatuses, it is determined that there is no storage apparatus capable of creating a volume (S1280). In this case, in the volume placement determination processing (categorization indicator method), the processing is ended in response to the calling source of the result that there is no apparatus capable of creating a volume.

In the description of FIG. 12, the storage apparatuses capable of creating a volume are searched in an ascending order of the numbers of indicators, however, they may also be searched in a descending order.

As described above, according to the volume placement determination processing (categorization indicator method), it is possible to determine the volume placement at a high speed.

Volume Placement Determination Processing (Categorization Table Method)

Next, the volume placement determination processing (categorization table method) (S1300) will be described.

Figure 13:
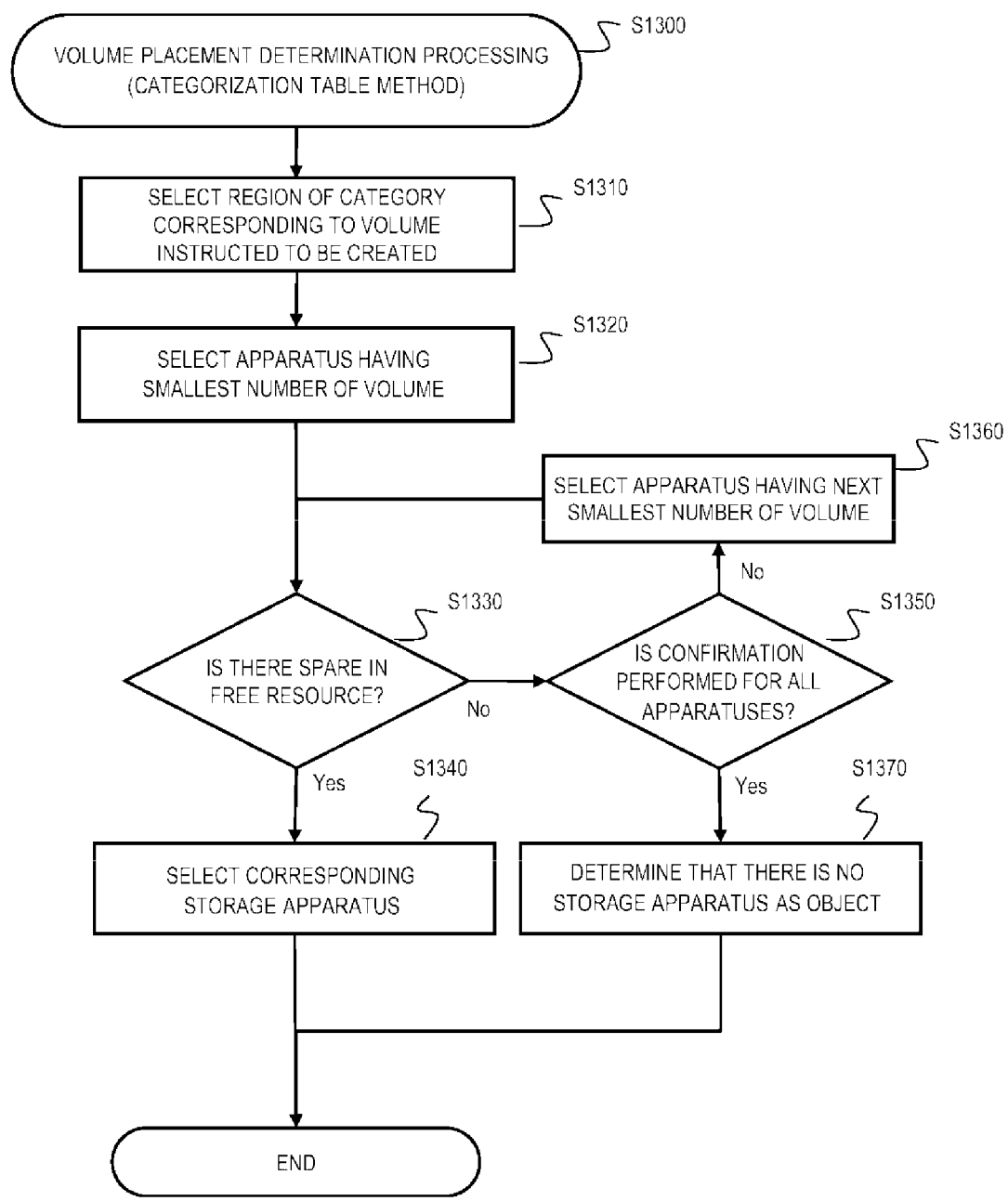
FIG. 13 is a flowchart of a volume placement determination processing (categorization table method).

FIG. 13 is a flowchart of the volume placement determination processing (categorization table method) according to one embodiment.

The volume placement determination processing (categorization table method) is executed by the volume placement determination program 403 of the storage management device 103.

In the volume placement determination processing (categorization table method), first, the feature amount category-specified volume number management table 413 is referred to, and a region of a category corresponding to a volume instructed to be created is selected (S1310). For example, when the size of the volume instructed to be created is "large" and the performance requirement is "Gold", the region of category #1 (first to tenth rows in the figure) is selected.

Next, in the volume placement determination processing (categorization table method), the volume numbers 905 currently owned by respective apparatuses are confirmed in the corresponding region, and an apparatus having a minimum volume number is selected (S1320). For example, in a case of the region of category #1, an apparatus number having the smallest volume number is "1".

Next, in the volume placement determination processing (categorization table method), it is confirmed whether there is a spare in free resource for the storage apparatus corresponding to the current apparatus number (S1330). The free resource is, for example, a free capacity or a free CPU utilization rate of the storage apparatus, and is confirmed by using the information of the storage apparatus management table 412.

In a case where it is determined that there is a spare in free resource, the storage apparatus corresponding to the current apparatus number is selected, and it is determined to create a volume (S1340). In addition, the value of the volume number 905 in the corresponding row in the feature amount category-specified volume number management table 413 is updated by +1.

Finally, in the volume placement determination processing (categorization table method), the processing is ended in response to a calling source of the apparatus number for which a volume is to be created.

In a case where it is determined in S1330 that there is no spare in free resource, it is confirmed whether confirmation of the free resource is performed for all the apparatuses (S1350). In a case where there remains an apparatus for which the free resource is not confirmed, an apparatus having the next smallest volume number is selected (S1360), and the processing proceeds to S1330 again. In a case where the free resource is confirmed for all the apparatuses, it is determined that there is no storage apparatus capable of creating a volume (S1370). In this case, in the volume placement determination processing (categorization table method), the processing is ended in response to the calling source of the result that there is no apparatus capable of creating a volume.

As described above, according to the volume placement determination processing (categorization table method), since the volume number of each storage apparatus corresponding to the corresponding category of the volume instructed to be created is referred to, it is possible to effectively distribute the feature amounts of the volume in each storage apparatus.

Volume Placement Determination Processing (Min-Max Enlargement Method)

Next, the volume placement determination processing (Min-Max enlargement method) (S1400) will be described.

Figure 14:
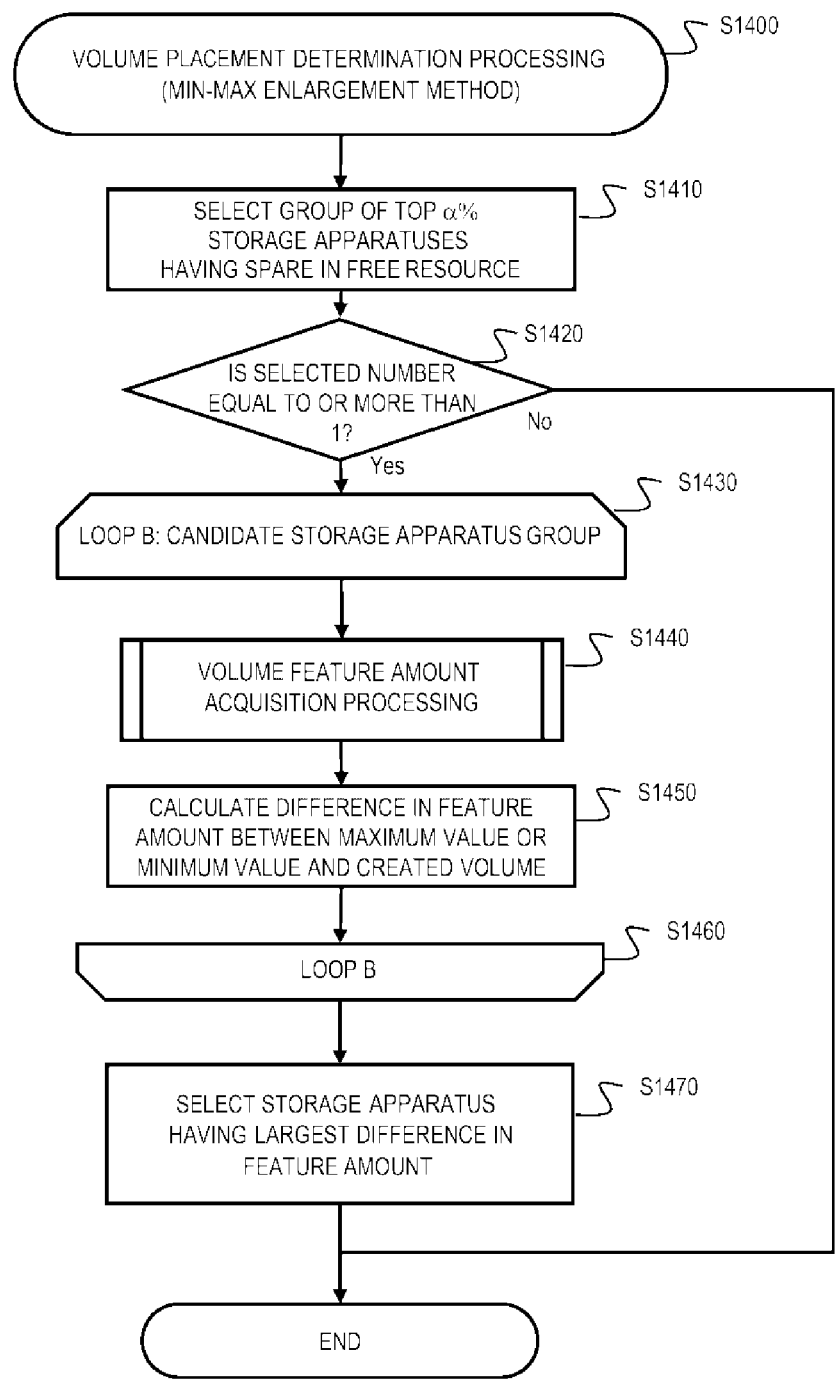
FIG. 14 is a flowchart of a volume placement determination processing (Min-Max enlargement method).

FIG. 14 is a flowchart of the volume placement determination processing (Min-Max enlargement method) according to one embodiment.

The volume placement determination processing (Min-Max enlargement method) is executed by the volume placement determination program 403 of the storage management device 103.

In the volume placement determination processing (Min-Max enlargement method), first, a group of top $\alpha\%$ storage apparatuses having a spare in free resource is selected (S1410). For example, in a case where $\alpha$ is 20%, if the total number of storage apparatuses is 10, the top two storage apparatuses having a spare in free resource are selected. The free resource is, for example, information of the storage apparatus management table 412 such as the free capacity and the free CPU utilization rate of the storage apparatus. $\alpha$ may be a value set in advance in the storage management device 103, or may be a value set by the administrator.

Next, the number of apparatus in the selected storage apparatus group is checked (S1420). When the number is equal to or more than 1, the processing proceeds to S1430. When the number is less than 1, that is, 0, it is determined that there is no apparatus capable of creating a volume since there is no storage apparatus having a spare in free resource, and the processing is ended.

Next, loop processing is started for each apparatus in a candidate storage apparatus group (S1430).

Next, a feature amount acquisition processing is performed on the storage apparatus 102 that is being processed in the current loop processing (S1440).

Next, a difference in feature amount between a maximum value or a minimum value of the acquired feature amount and the created volume is calculated (S1450). As shown in FIG. 5, since a plurality of viewpoints exist as the feature amount, the difference in the feature amounts is calculated for each viewpoint. Alternatively, a difference of only the feature amounts of a viewpoint of interest may also be calculated. For example, when the definition size of the created volume is "5 GB", since the minimum value of the definition size of the volume owned by the storage apparatus (FIG. 5) that is being processed in the current loop processing is "20 GB" and the maximum value thereof is "100 GB", the maximum value is not updated and the minimum value is updated. Therefore, the value of the maximum value is ignored, and the minimum value is "15 GB", which is the difference between 20 GB and 5 GB.

If there is a storage apparatus that is not an object of the loop processing among the candidate storage apparatus group, the processing returns to S1430, and the same processing is performed on the next storage apparatus (S1460).

After the processing is completed with respect to all the storage apparatuses of the candidate storage apparatus group, a storage apparatus having a largest absolute value of the difference is selected (S1470). When the distribution is calculated for a plurality of viewpoints, the storage apparatus having the largest value is selected based on an arithmetic average of the normalized absolute value of the respective differences or a weighted average obtained with the absolute value of the difference. When the distribution is calculated for a single viewpoint, only a storage apparatus having the largest absolute value of the difference is selected.

As described above, according to the volume placement determination processing (Min-Max enlargement method), it is possible to determine the arrangement destination of the volume in storage apparatuses that distributes more feature amounts.

Load Balancing Processing

Next, a load balancing processing (S1500) will be described.

Figure 15:
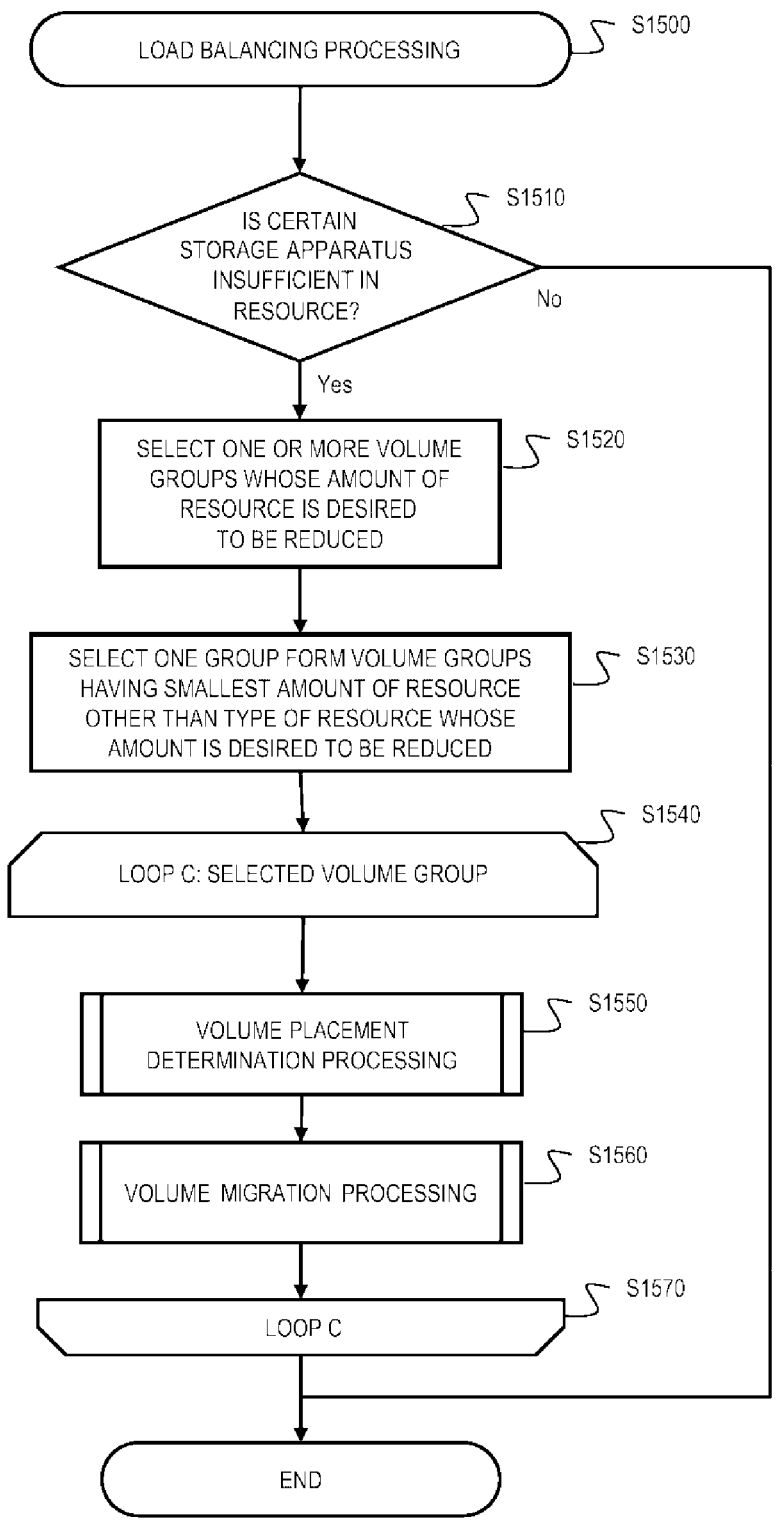
FIG. 15 is a flowchart of a load balancing processing.

FIG. 15 is a flowchart of the load balancing processing according to one embodiment.

The load balancing processing is executed by the load balancing program 402 of the storage management device 103. The program is executed with an instruction of an administrator or is executed periodically.

In the load balancing processing, first, it is determined whether a certain storage apparatus is insufficient in resource (S1510). When none of the storage apparatuses is insufficient in resource, the processing is ended. When there is a storage apparatus insufficient in resource, the processing proceeds to S1520. The resource is, for example, a capacity of the storage apparatus and a capability of the CPU.

Next, in the load balancing processing, one or more volume groups are selected from volume groups whose amount of resources is desired to be reduced with respect to the storage apparatus that is determined to be insufficient in resource (S1520). For example, when a resource whose amount is desired to be reduced has an amount of 1 TB in capacity, a group consisting of two volumes of 500 GB, a group consisting of one volume of 1 TB, a group consisting of one volume of 100 GB, one volume of 200 GB, and one volume of 700 GB, and the like are selected.

Next, in the load balancing processing, one group is selected from volume groups having the smallest amount of resource other than the type of the resource whose amount is desired to be reduced (S1530). For example, in a case where the type of the resource whose amount is desired to be reduced is capacity, a volume group having a small average IOPS of the total group is selected. The types of resources are viewpoints 1 to 5 shown in FIG. 5.

Next, in the load balancing processing, the loop processing is executed in a configuration volume unit (migration source volume) of the determined volume group (S1540).

Next, in the load balancing processing, a storage apparatus as a movement destination of the configuration volume to be processed is determined by a volume placement determination processing (S1550). This volume placement determination processing is the same as the volume placement determination processing executed during the volume creation instruction processing, and is already described with reference to FIG. 11, FIG. 12, FIG. 13, and FIG. 14.

Next, in the load balancing processing, the configuration volume to be processed is migrated from the currently arranged storage apparatus to the storage apparatus determined in S1550 (S1560). The movement processing will be described later with reference to FIG. 16.

The processing is executed for all configuration volumes (S1570).

Thus, the load balancing processing is ended.

However, in a case where there is another storage apparatus that is insufficient in resource, the processing is repeatedly executed.

Volume Creation Processing

Next, the volume creation processing (S1600) will be described.

Figure 16:
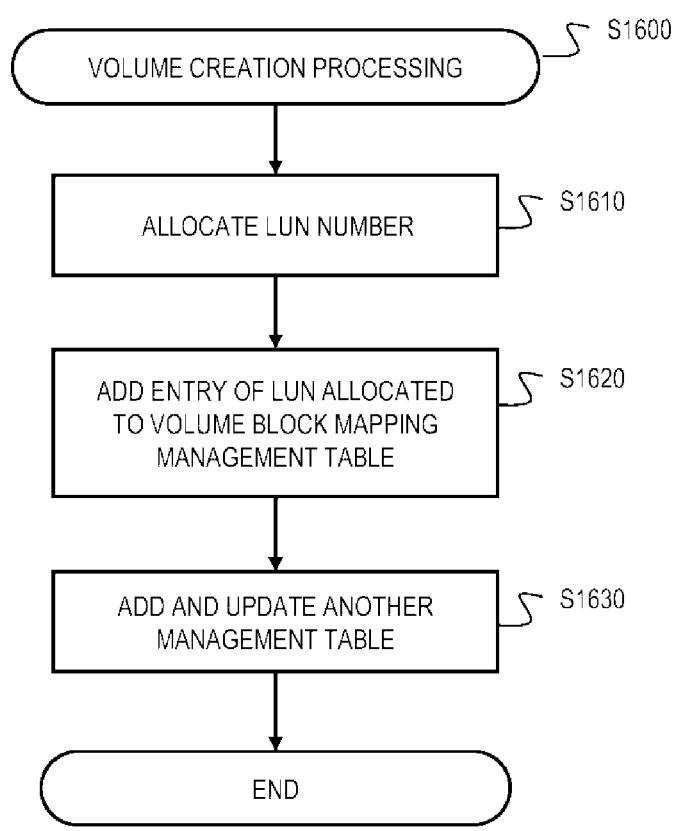
FIG. 16 is a flowchart of a volume creation processing.

FIG. 16 is a flowchart of the volume creation processing according to one embodiment.

The volume creation processing is executed by the volume creation program 301 of the storage apparatus 102.

In the volume creation processing, first, an unused LUN number is acquired by the apparatus (S1610).

Next, in the volume creation processing, the entry of the LUN allocated to the volume block mapping management table 312 is added (S1620).

Next, in the volume creation processing, another management table is added and updated (S1630). For example, a management table for performing the feature amount management table 311 and another storage service is added and updated.

Thus, in the volume creation processing, the processing is ended.

Volume Migration Processing

Next, a volume migration processing (S1700) will be described.

Figure 17:
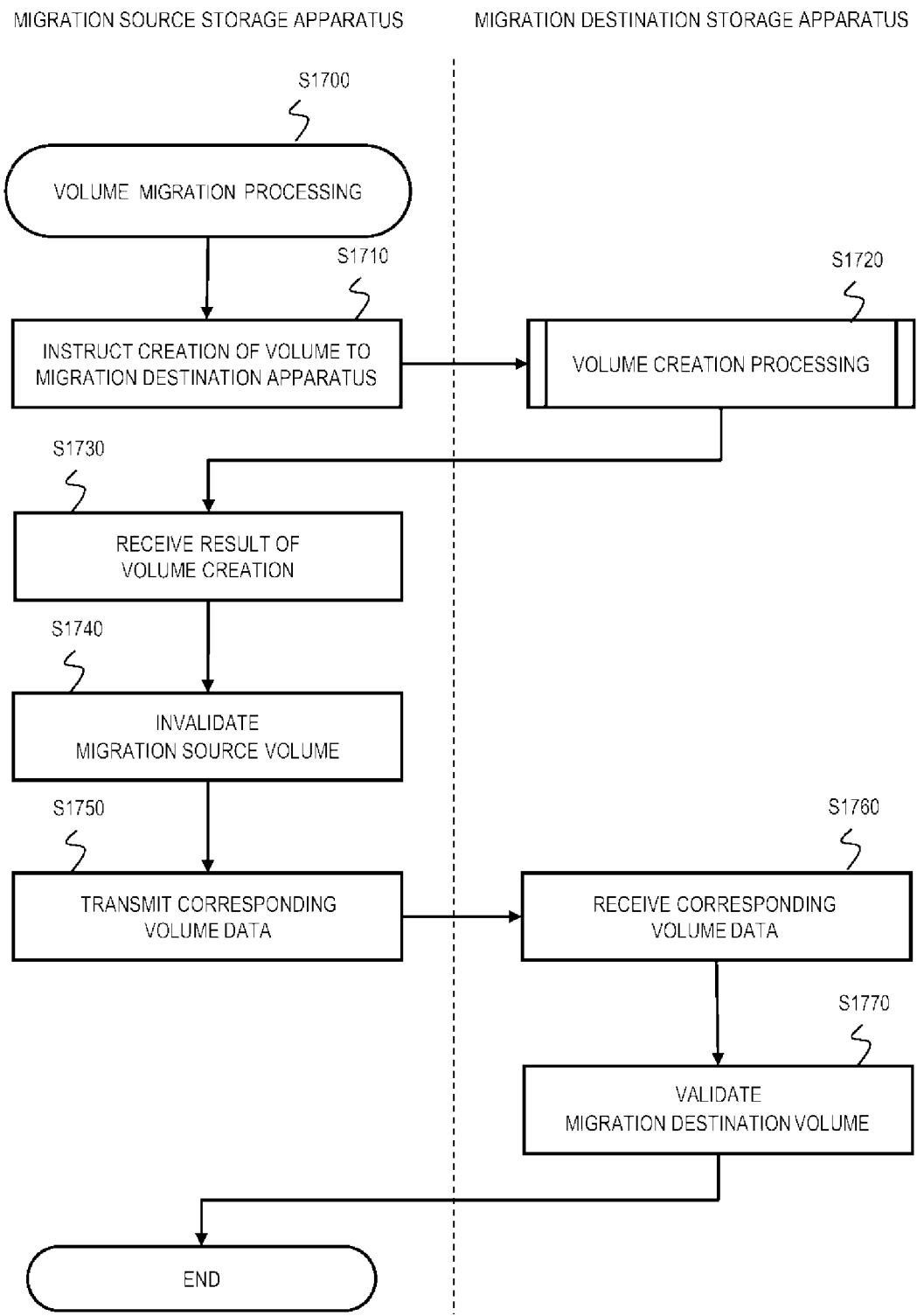
FIG. 17 is a flowchart of a volume migration processing.

FIG. 17 is a flowchart of the volume migration processing according to one embodiment.

The volume migration processing is executed by the volume migration program 302 of the storage apparatus 102.

In the volume migration processing, first, in a migration source storage apparatus, a volume creation instruction is performed with respect to a migration destination storage apparatus (S1710).

Next, in the volume migration processing, a volume creation processing is executed in the migration destination storage apparatus (S1720). Details of the volume creation processing are already described with reference to FIG. 16.

Next, in the volume migration processing, the result of the volume creation processing is received in the migration source storage apparatus (S1730).

Next, in the volume migration processing, the volume to be migrated is invalidated in the migration source storage apparatus (S1740). Here, the invalidation refers to become a state where a data input/output request from a computer to the same volume cannot be processed.

Next, in the volume migration processing, data of the volume to be migrated in the migration source storage apparatus is transmitted to the volume created by the migration destination storage apparatus (S1750).

Next, in the volume migration processing, the data of the volume to be migrated is received in the migration destination storage apparatus, and the data is stored in the created volume (S1760).

Next, in the volume migration processing, the created volume is validated in the migration destination storage apparatus (S1770). Here, the validation refers to become a state where a data input/output request from a computer to the same volume can be processed.

Thus, in the volume migration processing, the processing is ended.

Feature Amount Acquisition Processing

Next, the feature amount acquisition processing (S1800) and the feature amount providing processing (S1820) will be described.

FIG. 18 is a flowchart of the feature amount acquisition processing and the feature amount providing processing according to one embodiment.

The feature amount acquisition processing is executed by the feature amount acquisition program 404 of the storage management device 103. The feature amount providing processing is executed by the feature amount providing program 303 of the storage apparatus 102.

In the feature amount acquisition processing, first, a feature amount of the designated volume group is requested with respect to a storage apparatus. Here, the volume group is, for example, all the volumes held by a request destination storage apparatus.

The storage apparatus that has received the request performs the feature amount providing processing.

In the feature amount providing processing, first, the feature amount of the designated volume group is acquired from the feature amount management table 311 (S1830).

Next, in the feature amount providing processing, the acquired feature amount is transmitted to the request source storage management device (S1840). At this time, by adding an identifier of the storage apparatus that performs the feature amount providing processing to the feature amount, the storage management device can manage the feature amount for each storage apparatus.

Next, in the feature amount acquisition processing, the feature amount is received (S1850), and the processing is ended.

The invention is not limited to the above embodiment, and can be appropriately modified and implemented without departing from the spirit of the invention.

According to the present embodiment, in a system in which a plurality of storage apparatuses provide a plurality of volumes to one or more computers, when it is necessary to rearrange the volumes, it is easy to select a volume having a feature amount that reduces the imbalance, and a degree of imbalance can be further reduced. In addition, since the volume of an appropriate size and appropriate load is selected and migrated, the migration time can be shortened, and the time required for eliminating the imbalance can be shortened.

According to the volume placement determination processing (distributed calculation method), it is possible to distribute the feature amounts of the volume and to determine a storage apparatus as the arrangement destination of the new volume with a simple implementation.

According to the volume placement determination processing (categorization indicator method), it is possible to determine the volume placement at a high speed.

According to the volume placement determination processing (categorization table method), since the volume number of each storage apparatus corresponding to the corresponding category of the volume instructed to be created is referred to, it is possible to effectively distribute the feature amounts of the volume in each storage apparatus.

According to the volume placement determination processing (Min-Max enlargement method), it is possible to determine the arrangement destination of the volume in storage apparatuses that distributes more feature amounts.

What is claimed is:

1. A computer system, comprising: a plurality of storage apparatuses that provide a volume to a computer; and a storage management device that manages the plurality of storage apparatuses, wherein
when a new volume is to be created in any storage apparatus of the plurality of storage apparatuses, the storage management device calculates a current distribution of feature amounts of a plurality of volumes provided to the computer and an expected distribution of the feature amounts after creating the new volumes for each storage apparatus, and selects a storage apparatus which has a large difference between the current distribution and the expected distribution, and
the selected storage apparatus creates the new volume.

2. The computer system according to claim 1, wherein a volume usage capacity is an effective size of the volume, and a volume performance requirement is any one of an I/O throughput of the volume and an TOPS of the volume.

3. The computer system according to claim 2, wherein a feature amount is obtained by adding any one of a logical size of the volume and a read/write ratio of I/O of the volume.

4. The computer system according to claim 1, wherein
the storage management device calculates a first distribution of feature amounts of a volume provided by a storage apparatus at a current time and a second distribution of feature amounts of a volume provided by the storage apparatus in a case where the new volume is created with respect to a group of storage apparatuses having a free resource among the plurality of storage apparatuses, and instructs a storage apparatus having a largest difference between the first distribution and the second distribution to create a volume, and
the storage apparatus that has received a volume creation instruction from the storage management device creates the new volume.

5. A computer system comprising: a plurality of storage apparatuses that provide a volume to a computer; and a storage management device that manages the plurality of storage apparatuses, wherein the storage management device has information on a management number of a storage apparatus in which the volume is created last for each category of a feature amount of the volume, and refers to a management number of a storage apparatus of a category whose feature amount matches a feature amount of a new volume, and when the new volume is to be created, specifies a storage apparatus having a management number in an ascending order by adding 1 to this management number, or in a descending order by subtracting 1 from this management number, the specified storage apparatus confirms whether there is a resource for creating the new volume, and receives an instruction from the storage management device to create the new volume in a case where there is a resource for creating the new volume, and the storage apparatus that has received the instruction creates the new volume.

6. A computer system comprising: a plurality of storage apparatuses that provide a volume to a computer; and a storage management device that manages the plurality of storage apparatuses, wherein the storage management device has information on the number of volumes provided by each storage apparatus for each category of a feature amount of the volume, and confirms whether there is a resource for creating a volume with respect to storage apparatuses in descending order of the number of volumes provided which are related to a category whose feature amount matches the feature amount of a new volume, and instructs a storage apparatus that has been initially confirmed to have free resources to create a volume when the new volume is to be created, and the storage apparatus that has received an instruction from the storage management device creates the new volume.

7. The computer system according to claim 1, wherein the storage management device instructs a storage apparatus, having a largest difference between a maximum value or a minimum value of a feature amount of a volume provided by a storage apparatus at a current time and a value of a feature amount of a volume provided by the each storage apparatus in a case where the new volume is created with respect to a group of storage apparatuses having a spare in free resource among the plurality of storage apparatuses, to create a volume, and the storage apparatus that has received an instruction from the storage management device creates the new volume.

8. The computer system according to claim 1, wherein the storage management device sends a request to each of the plurality of storage apparatuses for a feature amount related to a volume provided by each storage apparatus, and each storage apparatus that has received the request responds to the request of the feature amount related to the volume provided by each storage apparatus.

9. A computer system, comprising: a plurality of storage apparatuses that provide a volume to a computer; and a storage management device that manages the plurality of storage apparatuses, wherein when a migration source volume of a storage apparatus insufficient in resources among the plurality of storage apparatuses is migrated to another storage apparatus, the storage management device:

calculates a current distribution of feature amounts of a plurality of volumes provided to the computer and an expected distribution of the feature amounts after migrating the migration source volume, and selects a storage apparatus in which a difference between feature amounts of a plurality of volumes provided to the computer by each storage apparatus increases as a result of a migration of the migration source volume, wherein a feature amount is a volume usage capacity and a volume performance requirement in each storage apparatus; and the migration source volume is migrated to the selected storage apparatus.

10. The computer system according to claim 9, wherein any storage apparatus of the plurality of storage apparatuses and the storage management device that manages the plurality of storage apparatuses are configured with the same physical computer.

11. A volume placement method in a computer system including a plurality of storage apparatuses that provide a volume to a computer, and a storage management device that manages the plurality of storage apparatuses, wherein when a new volume is to be created in any storage apparatus of the plurality of storage apparatuses, the storage management device calculates a current distribution of feature amounts of a plurality of volumes provided to the computer and an expected distribution of the feature amounts after creating the new volumes for each storage apparatus, and selects a storage apparatus which has a large difference between the current distribution and the expected distribution, and the selected storage apparatus creates the new volume.

12. A volume placement method in a computer system including a plurality of storage apparatuses that provide a volume to a computer, and a storage management device that manages the plurality of storage apparatuses, wherein the storage management device has information on the number of volumes provided by each storage apparatus for each category of a feature amount of the volume, and confirms whether there is a resource for creating a volume with respect to storage apparatuses in ascending order of the number of volumes provided related to a category whose feature amount matches the feature amount of a new volume, and instructs a storage apparatus that has been initially confirmed to have free resources to create a volume when the new volume is to be created, and the storage apparatus that has received an instruction from the storage management device creates the new volume.

* * * * *